June 21, 1927.
R. R. JONES
1,633,548
SEAL FOR DRIERS, HEATERS, OR THE LIKE
Filed Dec. 4, 1925
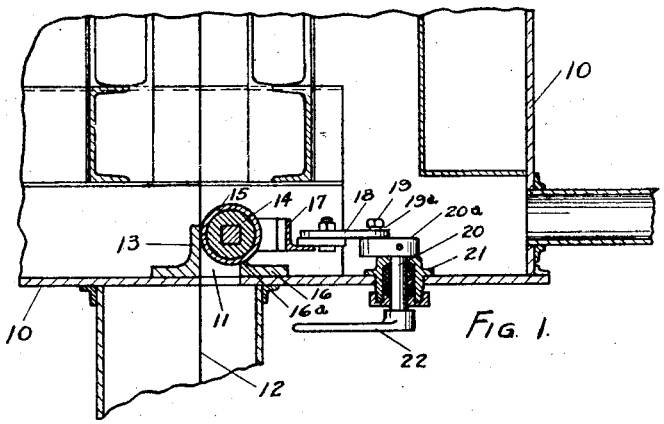
FIG. 1.
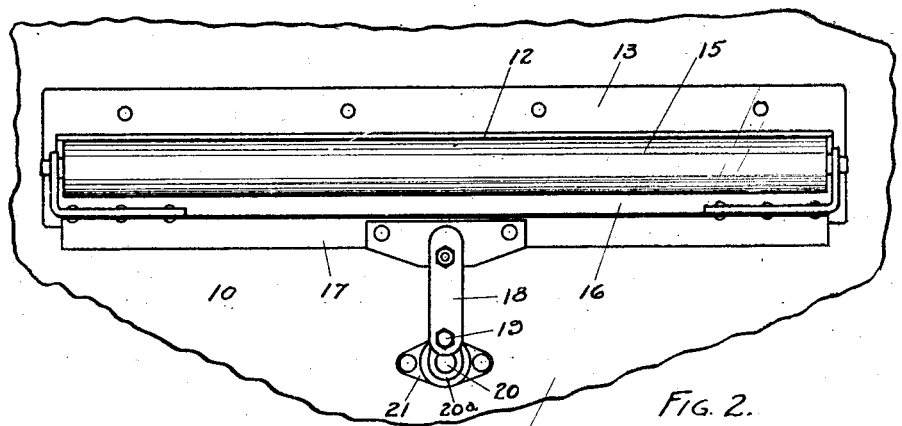
FIG. 2.
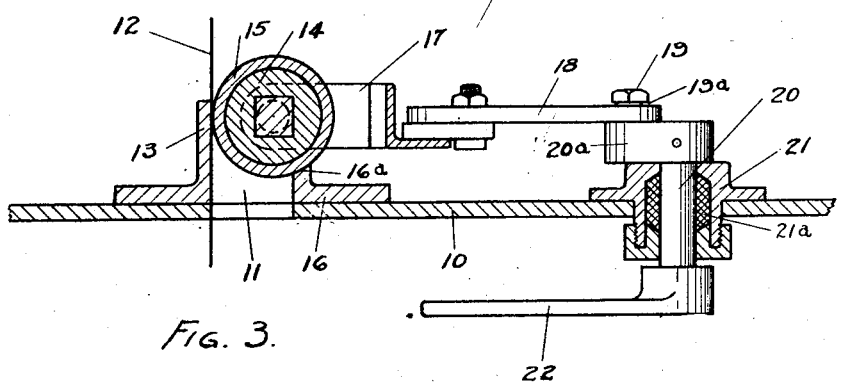
FIG. 3.
INVENTOR.
ROBERT R. JONES
BY
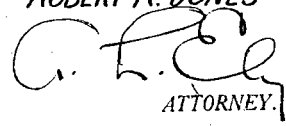
ATTORNEY.

Patented June 21, 1927.

1,633,548

UNITED STATES PATENT OFFICE.

ROBERT R. JONES, OF AKRON, OHIO, ASSIGNOR TO THE FIRESTONE TIRE AND RUBBER COMPANY, OF AKRON, OHIO, A CORPORATION OF OHIO.

SEAL FOR DRIERS, HEATERS, OR THE LIKE.

Application filed December 4, 1925. Serial No. 73,291.

This invention relates to improvements in seals for driers, heaters or the like for use in treating continuous strip material.

The chief object of the invention is to provide an improved device for sealing the inlet or outlet of the drier or heater through which the material is conducted for treatment.

The foregoing and other objects are obtained by the drier seal illustrated in the accompanying drawings and described below with reference to devices for drying impregnated fabric. It will be understood that the invention is not limited to the specific form or the specific application thereof here shown.

Of the accompanying drawings:

Figure 1 is a vertical section at the inlet of a drier used in making rubber impregnated fabric;

Figure 2 is an enlarged plan of the sealing device used in said inlet; and

Figure 3 is an enlarged sectional elevation thereof.

Referring to the drawings, 10 designates the casing of a drier having therein an inlet 11 through which material such as rubber-impregnated fabric, indicated at 12, may be conducted into the drier. On one side of said inlet 11 there is provided an abutment member 13, and movable over the inlet 11 into engagement therewith is a sealing roller 14 having thereon a soft, yielding surface layer 15 preferably of felt or the like.

In order to effectively seal inlet 11, the roller 14, when in abutting relation with member 13, is arranged to ride on a sealing member 16 formed with an arc-shaped seat 16$^a$ for said roller.

Means are provided for moving roller 14 to withdraw it from over opening 11 when the material 12 is being threaded through the drier or for other purposes. This means includes a yoke 17 on which roller 14 is journaled and a link 18 connecting said yoke to a crank pin 19 on a crank shaft 20 journaled in casing 10 in a bearing 21 suitably packed as at 21$^a$. Crank shaft 20 projects from casing 10 and has thereon an operating lever 22. To permit roller 14 to ride over member 16 when withdrawn from over inlet 11, pin 19 has a shoulder 19$^a$ thereon so spaced from crank 20$^a$ on shaft 20 as to permit vertical play of link 18 on pin 19.

It will appear from the foregoing that a simple but effective seal has been provided for the purpose described, and which is capable of use at either the inlet to or outlet from driers or similar devices for treating continuous strip material.

Modifications of the invention may be resorted to without departing from the spirit thereof or the scope of the appended claims.

What is claimed is:

1. A seal for apparatus of the class described, comprising an abutment member adjacent one side of an opening therein, a roller movable across said opening into engagement with said abutment member, a sealing member adjacent the other side of said opening and formed with an arc-shaped seat for said roller, and means for moving the roller over said opening, comprising a yoke on which the roller is journaled, a crank shaft journaled in the casing, said shaft projecting from the casing, an operating lever secured on the shaft outside of the casing, and a link connecting said crank shaft to said yoke, said connection being adapted to permit said roller to ride over said arc-shaped seat when it is moved from over said opening.

2. A seal for apparatus of the class described, comprising an abutment member adjacent one side of an opening therein, a roller lineally movable across said opening into engagement with said abutment member, a sealing member adjacent the other side of said opening and formed with an arc-shaped seat for said roller, and means for lineally moving the roller over said opening, said means being adapted to permit said roller to ride over said arc-shaped seat when it is moved from over said opening.

ROBERT R. JONES.